(12) United States Patent
Laurentino et al.

(10) Patent No.: US 11,263,697 B2
(45) Date of Patent: Mar. 1, 2022

(54) REMOTE CLAIMS ADJUSTER

(71) Applicant: Esurance Insurance Services, Inc., San Francisco, CA (US)

(72) Inventors: Joseph S. Laurentino, Roseville, CA (US); Philip Rodoni, San Rafael, CA (US)

(73) Assignee: Esurance Insurance Services, Inc., San Francisco, CA (US)

( * ) Notice: Subject to any disclaimer, the term of this patent is extended or adjusted under 35 U.S.C. 154(b) by 1302 days.

(21) Appl. No.: 15/200,765

(22) Filed: Jul. 1, 2016

(65) Prior Publication Data

US 2016/0328801 A1 Nov. 10, 2016

Related U.S. Application Data

(63) Continuation of application No. 14/158,610, filed on Jan. 17, 2014, now Pat. No. 9,407,874.

(60) Provisional application No. 61/817,806, filed on Apr. 30, 2013.

(51) Int. Cl.
| | |
|---|---|
| *G06Q 40/08* | (2012.01) |
| *H04N 7/15* | (2006.01) |
| *G06Q 10/10* | (2012.01) |
| *H04N 21/2543* | (2011.01) |
| *H04N 21/414* | (2011.01) |
| *H04N 21/4788* | (2011.01) |

(52) U.S. Cl.
CPC ............ *G06Q 40/08* (2013.01); *G06Q 10/10* (2013.01); *H04N 7/15* (2013.01); *H04N 7/155* (2013.01); *H04N 21/2543* (2013.01); *H04N 21/41407* (2013.01); *H04N 21/4788* (2013.01)

(58) Field of Classification Search
CPC .......... G06Q 40/08; G06Q 10/10; H04N 7/15; H04N 7/155; H04N 21/2543; H04N 21/41407; H04N 21/4788
USPC ................................................. 705/4; 348/14
See application file for complete search history.

(56) References Cited

U.S. PATENT DOCUMENTS

| | | |
|---|---|---|
| 7,978,219 B1 | 7/2011 | Imes |
| 7,978,900 B2 | 7/2011 | Nepomniachtchi et al. |
| 8,195,384 B1 | 6/2012 | Billman |
| (Continued) | | |

OTHER PUBLICATIONS

Mobile Solutions for Claims Management (Year: 2012).*

(Continued)

*Primary Examiner* — Christine M Behncke
*Assistant Examiner* — Murali K Dega
(74) *Attorney, Agent, or Firm* — Polsinelli PC

(57) ABSTRACT

Various aspects of the subject technology relate to systems, methods, and machine-readable media for investigating an insurance claim. A system may be configured to perform operations including establishing a video conferencing session with a mobile device associated with an insurance product and providing a user interface configured to provide a claims adjuster with remote control of a set of functions on the mobile device associated with the insurance product during the video conferencing session. The operations further include receiving, via the user interface, instructions for requesting the mobile device to perform at least one function in the set of functions on the mobile device and transmitting, to the mobile device, a request to perform the at least one function on the mobile device.

19 Claims, 6 Drawing Sheets

(56) References Cited

U.S. PATENT DOCUMENTS

| | | | |
|---|---|---|---|
| 8,401,878 B2 | 3/2013 | Stender | |
| 8,488,003 B1 | 7/2013 | Imes | |
| 8,510,196 B1* | 8/2013 | Brandmaier | G06Q 40/08 |
| | | | 705/35 |
| 8,639,410 B1 | 1/2014 | Billman | |
| 9,064,290 B2 | 6/2015 | Kneppers et al. | |
| 2002/0002475 A1* | 1/2002 | Freedman | G06Q 40/02 |
| | | | 705/4 |
| 2005/0038682 A1* | 2/2005 | Gandee | G06Q 30/06 |
| | | | 705/4 |
| 2007/0162291 A1 | 7/2007 | Barro | |
| 2009/0265193 A1 | 10/2009 | Collins et al. | |
| 2010/0174564 A1* | 7/2010 | Stender | G06Q 10/10 |
| | | | 705/4 |
| 2011/0047221 A1* | 2/2011 | Watanabe | G06Q 10/10 |
| | | | 709/206 |
| 2011/0161100 A1 | 6/2011 | Peak et al. | |
| 2011/0249077 A1 | 10/2011 | Abuan et al. | |
| 2012/0262296 A1 | 10/2012 | Bezar | |
| 2012/0303728 A1 | 11/2012 | Fitzsimmons et al. | |
| 2013/0060710 A1 | 3/2013 | Preuss et al. | |
| 2013/0182138 A1 | 7/2013 | Cho | |
| 2013/0297353 A1 | 11/2013 | Strange et al. | |
| 2013/0317861 A1 | 11/2013 | Tofte | |
| 2013/0317864 A1 | 11/2013 | Tofte | |
| 2013/0329943 A1 | 12/2013 | Christopulos | |
| 2013/0346115 A1 | 12/2013 | Peak et al. | |
| 2014/0039937 A1 | 2/2014 | Murphy | |
| 2014/0257864 A1 | 9/2014 | Billman | |
| 2014/0320590 A1* | 10/2014 | Laurentino | H04N 7/155 |
| | | | 348/14.08 |
| 2015/0022617 A1 | 1/2015 | Le | |
| 2015/0025914 A1 | 1/2015 | Lekas | |
| 2015/0278761 A1 | 10/2015 | Hamann | |
| 2015/0287152 A1 | 10/2015 | Oakes | |

OTHER PUBLICATIONS

Digital Inspections, Spex Property Inspection App for Insurance Adjusters and Contractors overview, 7 pages (2015).

Horizon Home Inspection Software overview, 3 pages. Accessed 2015.

Innovative Home Inspection Software, Engine Industrious Reports offer, 2 pages (2015).

Palm-Tech Home Inspection Software, Home Inspection Software: iPhone, iPad, Android & Windows Compatible overview, 3 pages. Accessed Mar. 12, 2015.

* cited by examiner

400

REMOTE CLAIMS ADJUSTER

CROSS-REFERENCE TO RELATED APPLICATION

This application is a continuation application of U.S. patent application Ser. No. 14/158,610, filed, Jan. 17, 2014, entitled "REMOTE CLAIMS ADJUSTER," which claims the benefit of U.S. Provisional Patent Application No. 61/817,806, filed Apr. 30, 2013, entitled "APPARATUS AND METHOD FOR VIRTUALIZED APPRAISAL OF AN INSURED OBJECT." The contents of both of the aforementioned applications are hereby incorporated by reference in their entirety.

BACKGROUND

The present disclosure generally relates to providing insurance services and, in particular, to appraising insurance claims of customers.

Customers may insure property and/or items (e.g., houses, vehicles, belongings, etc.) with an insurance provider. In some cases, if an insured item is damaged, a customer may submit an insurance claim and schedule a time for a claims adjuster to view the damage to the insured item. For example, if an insured vehicle is damaged in an accident, the customer may submit an insurance claim and schedule a time for a claims adjuster to come to the customer's home and view the damage to the vehicle.

However, setting up a time and place for a claims adjuster to go to view the damage may be inconvenient. For example, it may be difficult to find a time that both the customer and the claims adjuster can meet and unforeseen circumstances may cause one party to be unable to meet exactly at the appointed time. Furthermore, travelling to the location where the damaged item may be viewed may be time consuming and costly.

SUMMARY

Various aspects of the subject technology relate to system for investigating an insurance claim. The system includes one or more processors and a machine-readable medium comprising instructions stored therein, which when executed by the one or more processors, cause the one or more processors to perform operations. The operations include establishing a video conferencing session with a mobile device associated with an insurance product and providing a user interface configured to provide a claims adjuster with remote control of a set of functions on the mobile device associated with the insurance product during the video conferencing session. The operations further include receiving, via the user interface, instructions for requesting the mobile device to perform at least one function in the set of functions on the mobile device and transmitting, to the mobile device, a request to perform the at least one function on the mobile device.

Some aspects of the subject technology relate to a method for investigating an insurance claim. The method includes establishing a video conferencing session between a mobile device associated with a user and a system associated with a claims adjuster and providing an interface on the system to enable control of a set of functions on the mobile device associated with the user during the video conferencing session, wherein the set of functions comprises capturing an image with a camera using the mobile device. The method further includes receiving, via the interface, instructions for requesting the mobile device to capture the image, transmitting, during the video conferencing session and based on the received instructions, a request to capture an image by the mobile device, wherein the request is configured to cause the mobile device to capture the image in response to the request, and receiving, in response to the transmitted request, the captured image from the mobile device.

Some aspects of the subject technology relate to a non-transitory machine-readable medium comprising instructions stored therein, which when executed by a machine, cause the machine to perform operations. The operations include establishing a video conferencing session with a mobile device associated with a user with an insurance policy and providing an interface configured to provide a claims adjuster with remote control of functions on the mobile device associated with the user during the video conferencing session, wherein the functions comprises capturing an image with a camera using the mobile device. The operations further include receiving, via the interface, instructions to request the mobile device to capture the image with the camera, transmitting, during the video conferencing session and based on the instructions, a request to capture the image to the mobile device, wherein the request is configured to cause the mobile device to capture the image in response to the request, and receiving, in response to the transmitted instructions, the captured image from the mobile device.

Additional aspects of the subject technology relate to a method for investigating an insurance claim. The method includes establishing video conferencing session between a mobile device associated with a user and a system associated with a claims adjuster, receiving, during the video conferencing session, a request to capture an image, capturing, in response to the request, the image using a camera using the mobile device, and transmitting the captured image to the system associated with the claims adjuster.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Various aspects of the subject technology relate to providing remote claim adjuster capabilities. For example, an insurance provider may provide a customer with one or more insurance products. Insurance products may include insurance policies for possessions (e.g., a vehicle) or property, health insurance, life insurance, or any other insurable item. In some cases, claims adjusters are used to process insurances claim for insurance products. However, instead of having a claims adjuster travel to the customer to process the customer's insurance claim, some or all of the claims adjusting process may be performed by the claims adjuster remotely.

Figure 1:
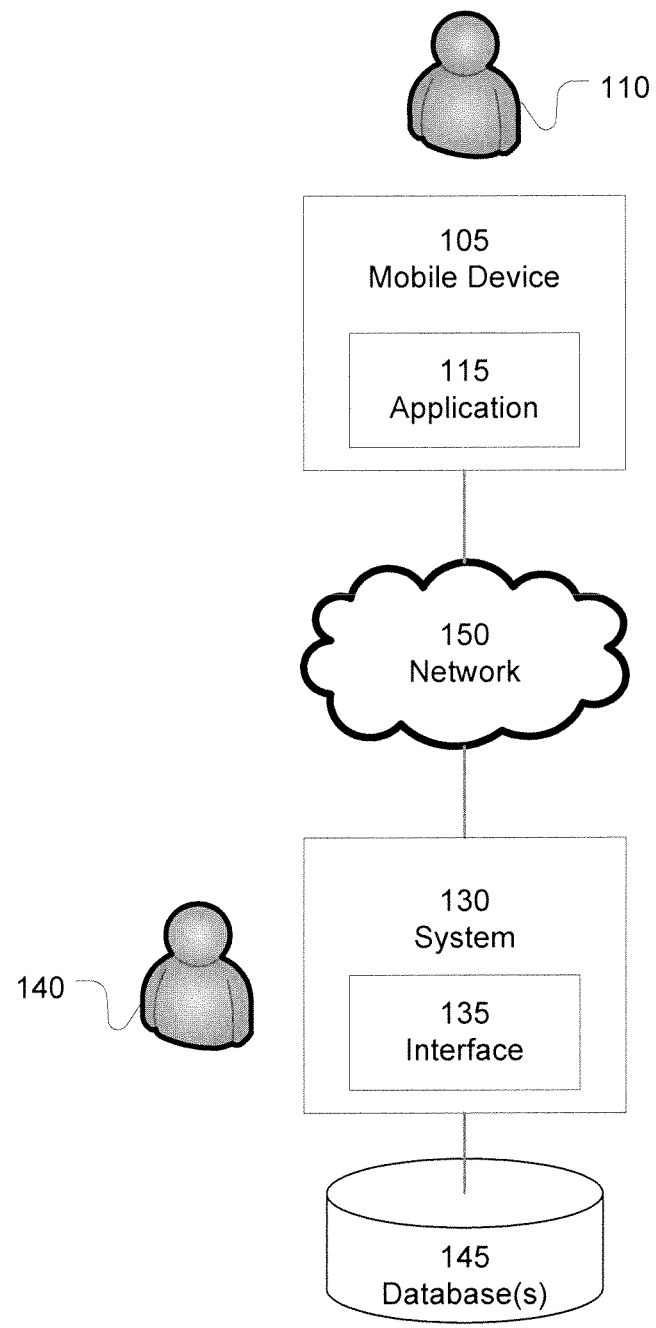
FIG. 1 is a block diagram illustrating an example environment in which a system for providing remote claim adjuster capabilities may exist in accordance with various aspects of the subject technology.

FIG. 1 is a block diagram illustrating an example environment 100 in which a system for providing remote claim adjuster capabilities may exist in accordance with various aspects of the subject technology. The network environment includes the system 130 for providing remote claim adjuster capabilities and one or more computing devices associated with a user or customer 110 in communication with one another via the network 150.

The computing device may be a mobile device 105 that includes for example, a smart phone, a tablet, a laptop, a camera device, or any other device capable of communicating with other devices via a network 150. The mobile device 105 may also include one or more applications 115 that may aid in providing remote claim adjuster capabilities. For example, an application 115 may be configured to enable one or more communication channels between the mobile device 105 and the system 130. The communications channels may include, for example, video conferencing channels, audio channels, text communications, channels for exchanging application data (e.g., instructions or requests), or a combination of different communications channels.

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The system 130 may be implemented on one or more computing machines (e.g., servers) in communication with the network 150. For example, the system 130 may be implemented on a desktop workstation, a laptop, a mobile device (e.g., a tablet or mobile phone), or any other computing device. The system 130 may be associated with an insurance platform provided by an insurance company and include one or more server machines affiliated with the insurance company. For example, the system 130 may belong to an insurance company or another party associated with an insurer.

The system 130 and the mobile device 105 are configured to provide remote claim adjuster capabilities by establishing a video conferencing session for a user 110 and a claims adjuster 140. Although in FIG. 1, the claims adjuster 140 is illustrated as a person, the claims adjuster may also be implemented as a part of the system 130 or part of a different machine-implemented system in other aspects of the subject technology.

A claims adjuster 140 may implement a claims adjustment process through the video conferencing session. The claims adjustment process may include capturing one or more images or photos of the user's property or item, transmitting the images to the system 130 for appraisal and/or storage. Additionally, the video captured during the video conferencing session may similarly be transmitted and used.

Providing claim adjustments through a video conferencing session allows users to schedule a time with a claims adjuster more easily because accommodations do not need to be made for the claims adjuster to visit the user. Furthermore, the claims adjustment process may be scheduled and completed earlier because there is no need to make plans for a claims adjuster to travel. Furthermore, a claims adjuster does not need to spend the time or incur the costs associated with a visit to the user.

According various aspects of the subject technology, the system 130 and the mobile device 105 may also be configured to enable remote control of certain functions of the mobile device 105 by the claims adjuster 140. For example, the application 115 on the mobile device 105 may be configured to access various capabilities of the mobile device 115 or capabilities of devices in communication with the mobile device 115. For example, the application 115 may have access to one or more cameras on the mobile device (e.g., a front-facing camera and/or a rear-facing camera), microphones on the mobile device, or other sensors or components on the device (e.g., an accelerometer, infrared sensors, a global positioning system, a light, etc.).

The application 115 on the mobile device 105 may also provide a way for the claim appraiser 140 to access and control the various functions or capabilities through the system 130. For example, the system 130 may provide an interface 135 (e.g., a user interface) where the claim appraiser 140 may control certain capabilities of the mobile device 105. The interface 135 may allow the claim appraiser 140 to, for example, request that the mobile device 105 capture an image, activate a flash when capturing an image, turn on a light on the mobile device, zoom in the camera, focus the camera, adjust an exposure setting on the camera, or switch a view on a display on the mobile device.

The switching of the view on the display of the mobile device may include switching the view to at least one of a view of what a front-facing camera is detecting, a view of what a rear-facing camera is detecting, or a video conferencing view of a remote camera (e.g., a view of a camera in communication with the system 130 or a view of the claims adjuster 140). In additional aspects, switching a view may include changing the display on the mobile device to a portrait view, a landscape view, or a picture-in-picture view of multiple views.

Figure 2:
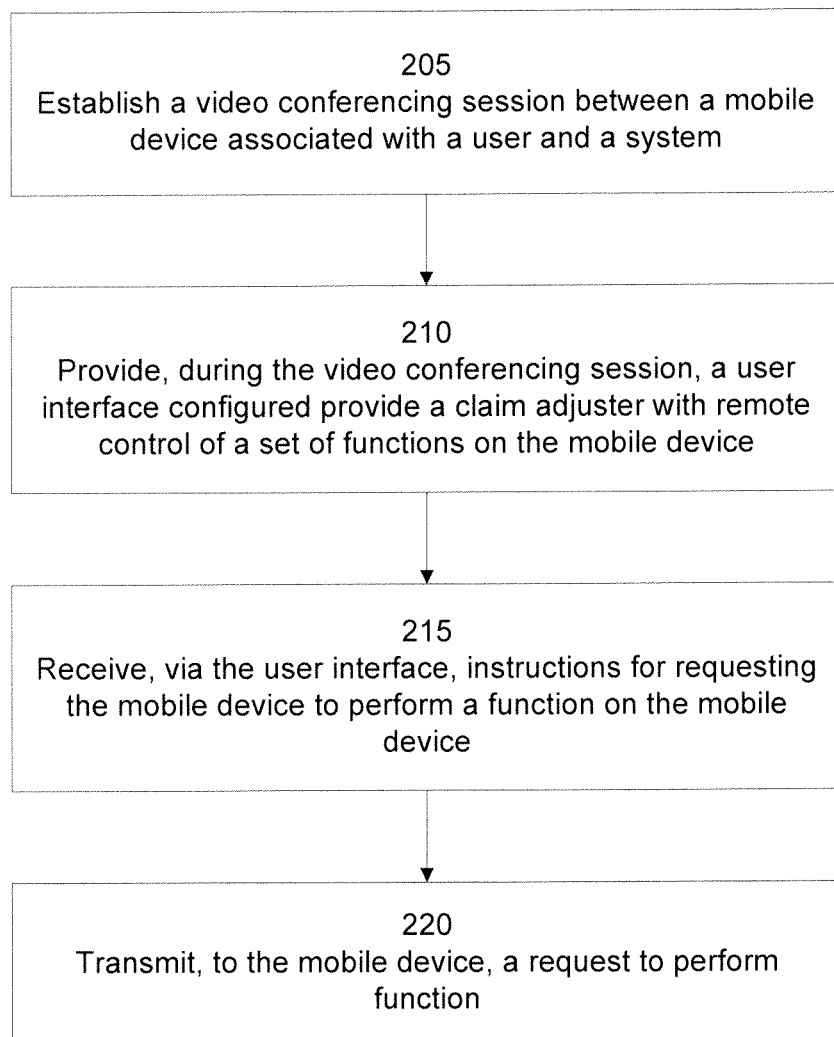
FIG. 2 is a flow chart illustrating an example process for providing remote claim adjuster capabilities in accordance with various aspects of the subject technology.

FIG. 2 is a flow chart illustrating an example process 200 for providing remote claim adjuster capabilities in accordance with various aspects of the subject technology. Although the blocks in FIG. 2 are shown in a particular order, other orderings are also possible. For example, some blocks may be performed in different orders or in parallel with other blocks.

At block 205, the system 130 may establish a video conferencing session between a mobile device 105 associated with a user and the system 130. According to some aspects of the subject technology, a user may install an application 115 on a mobile device 105 that enables the user to login and view information associated with one or more of the user's insurance policies. The mobile device 105 may also allow the user to initiate an insurance claim and/or schedule a claims adjustment video conference. According to some aspects of the subject technology, the mobile device 105 may also enable the user to begin a claims adjustment video conference immediately with claims adjusters on standby.

The system 130, at block 210, may provide the claims adjuster 140 with an interface configured to allow the claims adjuster 140 to remotely control a certain set of functions on the mobile device during the video conference session. Some example functions that the claims adjuster 140 may control on the mobile device 105 may include, for example, capturing an image with a camera, sending the captured image to the system 130, activating a flash when capturing the image, zooming the camera in or out, focusing the camera, or adjusting an exposure setting on the camera. The claims adjuster 140 may also be able to turn on a light on the mobile device, switch a view on a display on the mobile device, switch a view being transmitted to the system 130 via the video conferencing channel, or request a location of the mobile device (e.g., GPS coordinates or an address).

According to some aspects of the subject technology, the functions may also include displaying one or more visual indicator overlays on the display of the mobile device. The visual indicator overlay may be used to aid or direct the user during the claims adjustment process. The visual indicator overlay may be, for example, an arrow, a box, or a bracket that the claims adjuster 140 may use as a reference point to direct the user with. For example, the claims adjuster 140 may cause the visual indicator overlay to be displayed over a camera view and direct the user to place a vehicle identification number (VIN) or an area of damage where the arrow is pointing, inside the box, or inside the bracket. According to other aspects, the visual indicator overlay may be a highlighting of an object in the display of the mobile device. For example, the claims adjuster 140 may identify a target on the vehicle (e.g., a VIN number, a tire, the hood, etc.), highlight the target, and ask the user to capture an image of the highlighted target.

At block 215, the system 130 may receive, from the claims adjuster 140 via the user interface 135, instructions for requesting the mobile device to perform a function on the mobile device 105. In response to receiving the instructions via the user interface 135, the system 130 may transmit a request to the mobile device 105 to perform the function. When the application 115 on the mobile device 105 receives the request, the application 115 may perform the requested function on the mobile device 105.

Additional requests may also be transmitted and performed during the video conferencing session. By enabling the claims adjuster 140 to remotely control the mobile device 105, the claims adjuster 140 may be able to process the user's insurance claim more efficiently. For example, the claims adjuster 140 may not need to provide the user with lengthy instructions on how to capture an image of the insured object and hope the user understands what the claims adjuster 140 intends. Instead, the claims adjuster 140 may be able to process the claim more efficiently with fewer instructions being given to the user and/or possibly less chance for confusion or miscommunication. For example, the claims adjuster 140 may be able to ask the user to hold the mobile device 105 in a way such that the claims adjuster 140 may take an image. The claims adjuster 140 may then configure the camera to appropriate settings (e.g., zoom settings, focus settings, exposure settings, etc.), capture an image when desired, and keep capturing images until the claims adjuster 140 is satisfied.

Figure 3:
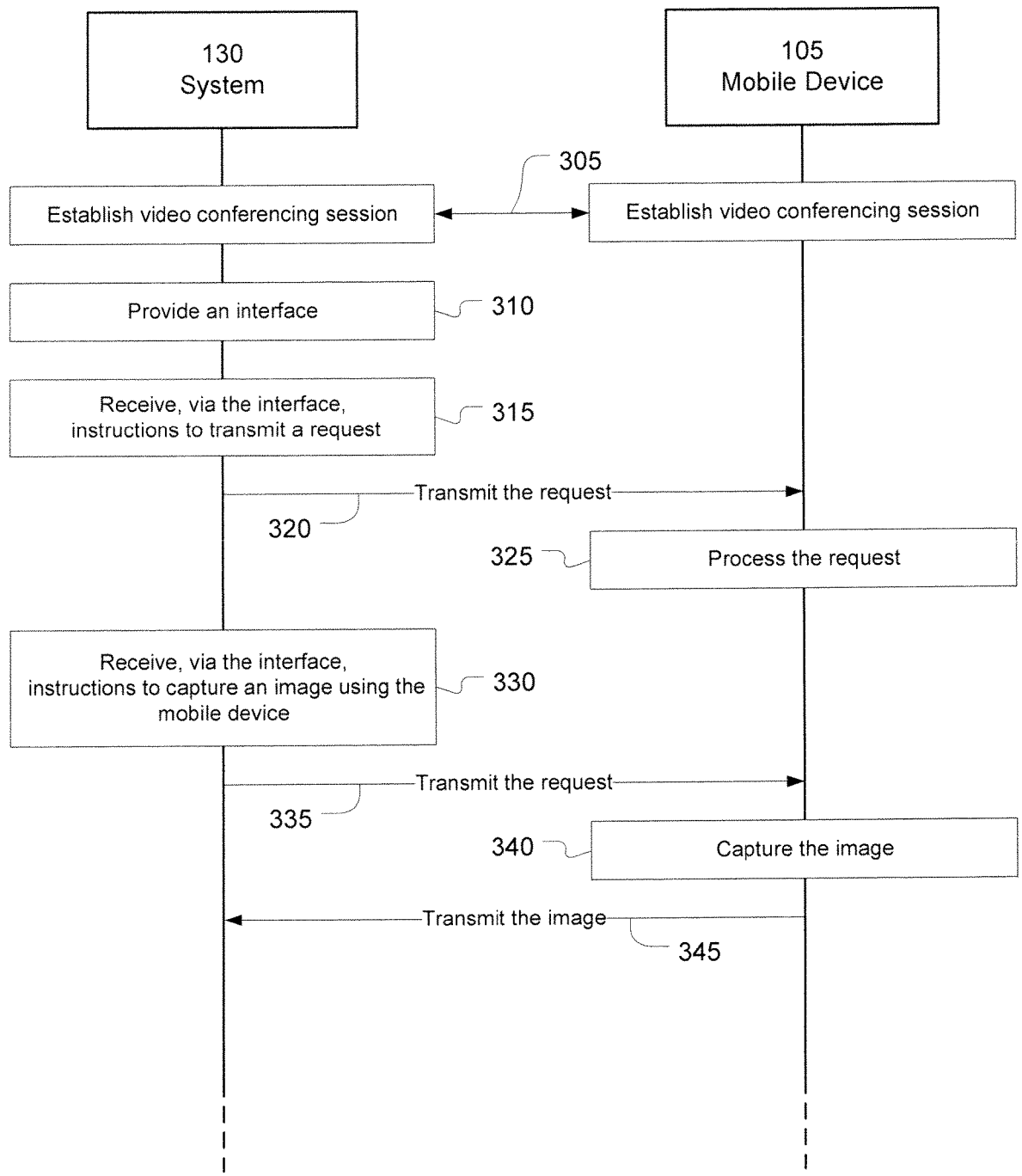
FIG. 3 is a data flow diagram illustrating an example process for providing remote claim adjuster capabilities in accordance with various aspects of the subject technology.

FIG. 3 is a data flow diagram illustrating an example process 300 for providing remote claim adjuster capabilities in accordance with various aspects of the subject technology. Although the operations in FIG. 3 are shown in a particular order, other orderings are also possible. For example, some operations may be performed in different orders or in parallel with other operations.

At 305, the system 130 and the mobile device 105 may establish a video conferencing session. For example, to establish the video conferencing session, the user may login to the application 115 on the mobile device 105 and initiate a video conference session with a claims adjuster 140. Alternatively or additionally, the claims adjuster 140 may also initiate a video conference session on the system 130.

Figure 4:
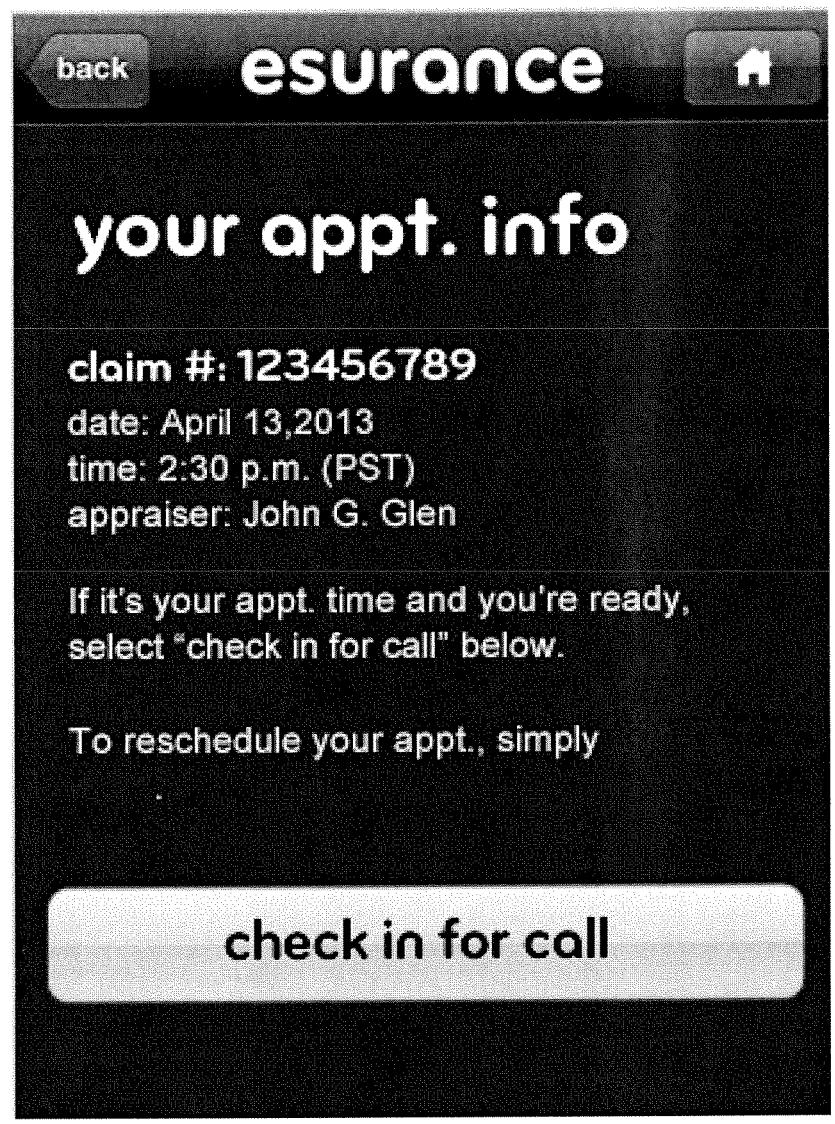
FIG. 4 is a user interface illustrating an example check-in screen that appears on a mobile device according to various aspects of the subject technology.

According to some aspects of the subject technology, at an appointed time, the user may login to the application 115 on the mobile device 105 and "check in" for the video conference session. For example, FIG. 4 is a user interface illustrating an example check-in screen 400 that appears on the mobile device 105 according to various aspects of the subject technology. The user interface may include the user's appointment information and a button for the user to "check in." Once the user activates the button to "check in," the application 115 may transmit an alert to a claims adjuster 140 handling the claim at the system 130 that the user is ready for the video conference.

The video conference session may be initiated by the claims adjuster 140 at the time of the scheduled appointment. When the video conference session is initiated, a notification may be presented to the user, giving them the option to answer or decline the video conference session. Upon the user selecting "answer," the user is directed to a video conference interface. If the user selects "decline," the claims adjuster 140 may be notified that the user has declined the video conference session.

According to some aspects of the subject technology, once the video conferencing session is established, the system 130 may provide, at 310, the claims adjuster 140 with an interface 135 to remotely control functions on the mobile device 105. Using the interface 135, the claims adjuster 140 may input instructions to transmit a request for the mobile device 105 to perform one or more functions. At 315, the system 130 may receive the instructions to transmit a request, and transmit the request to the mobile device 105 at 320. When the mobile device 105 receives the request, at 325, the mobile device 105 may process the request.

As described above, example requests may be for the mobile device 105 to configure certain camera settings, to change a view on the mobile device's display so that the user may see what one or more of the cameras on the mobile device are viewing, and/or to change a view being transmitted to the system 130. As the instructions and requests are being received, the claims adjuster 140 and the user may continue their conversation via the video conferencing session. For example, the claims adjuster 140 may ask that the user hold the mobile device 105 in such a way that the camera may capture a certain view of the insured object. The claims adjuster 140 may also be able to see the view of the camera via the video conferencing channel.

The claims adjuster 140 may also be able to remotely instruct the mobile device 105 to automatically capture an image. To illustrate, in the scenario above, when the user holds the mobile device 105 in such a way that the camera may capture a desired view of the insured object, the claims adjuster 140 may direct the mobile device 105 to capture the image using the provided interface. At 330, the system 130 may receive, via the interface, instructions from the claims adjuster 140 to capture an image using the mobile device 105. At 335, in response to receiving the instructions, the system 130 may transmit a request for the mobile device 105 to capture an image.

At 340, the mobile device 105 receives the request and automatically captures the image based on the received request. Once the image is captured, at 345, the mobile device 105 may transmit the captured image to the system 130 where it may be viewed by the claims adjuster. In some cases, the captured image may be a higher resolution or better quality than the images received through the video conferencing channel. Accordingly, the captured images may be saved on a memory by the system 130 while the video feed received via the video conferencing channel is not. According to other aspects of the subject technology, however, both the captured images and the video feed may be stored for future reference.

Additional requests for various mobile device 105 functions may also be transmitted and received during the video conference session in the course of the claims adjustment process. Furthermore, during the claims adjustment process, the interface 135 may also provide a way for the claims adjuster 140 to make claim determinations associated with an insurance product (e.g., an insurance policy). For example, based on the video conferencing session, the claims adjuster 140 may make determinations of fault, liability, damages, or coverage and input the determinations into the system 130 via the interface 135.

Once determinations are received by the system 130, they may be provided to an insurance platform, which may be separate from or a part of the system 130. According to some aspects of the subject technology, the insurance platform may use the determinations to adjust an insurance product (e.g., an insurance policy) associated with the user or with the insured product. The adjustments may include, for example, increasing or decreasing fees associated with an insurance product, generate alerts to an owner of an insurance product, or associate a record of the insurance claim with an insurance product. Advertisements or other content may also be provided to the owner of the insurance product based on the determinations received from the claims adjuster 140 via the interface 135.

In some cases the channels that support the communications between the system 130 and the mobile device 105 may not be able to handle all the data transmitted between the system 130 and the mobile device 105. Accordingly, some aspects of the subject technology relate to determining connection metrics for the video conferencing session and adjusting characteristics of the video conferencing session based on the connection metrics.

Figure 5:
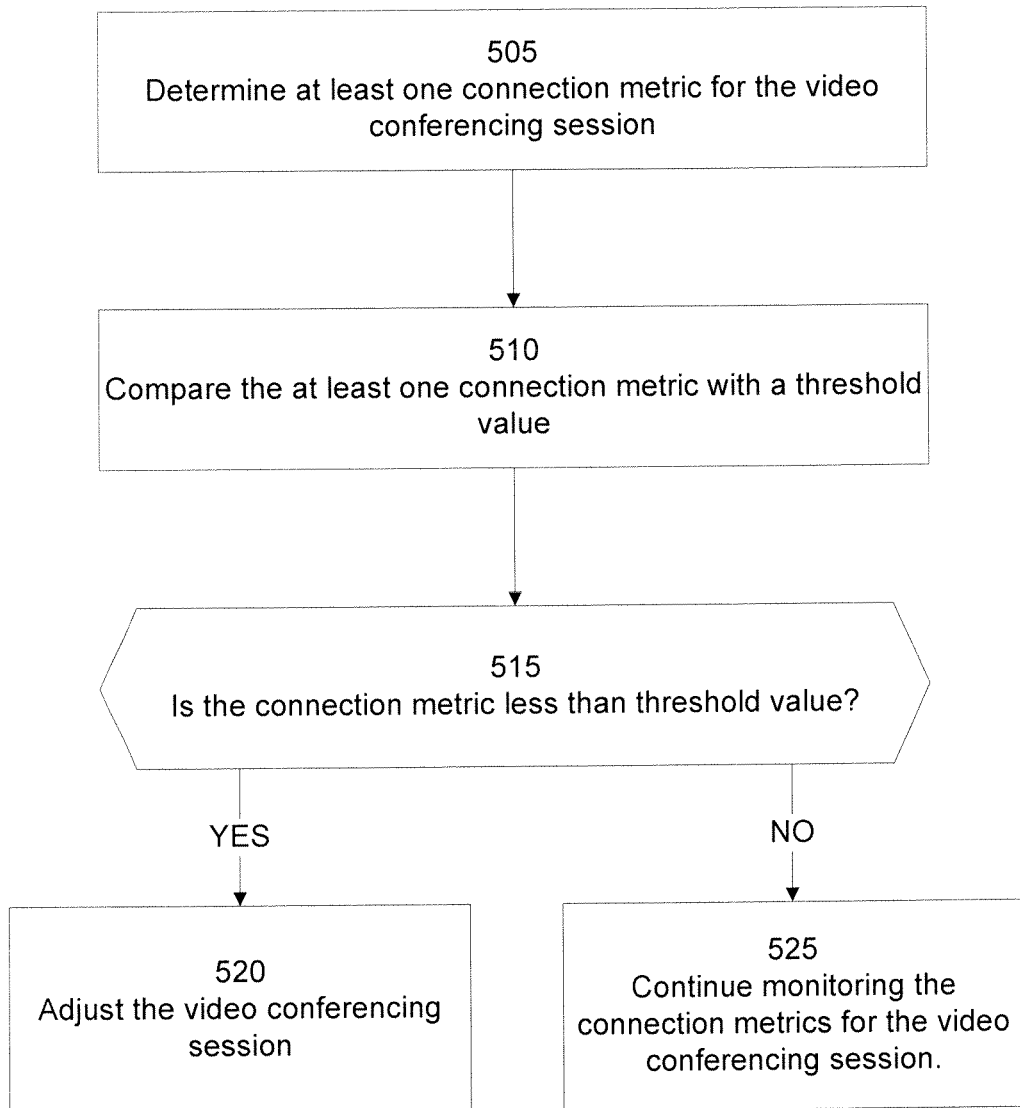
FIG. 5 is a flow chart illustrating an example process for adjusting the video conferencing session based on a connection metric in accordance with various aspects of the subject technology.

FIG. 5 is a flow chart illustrating an example process 500 for adjusting the video conferencing session based on a connection metric in accordance with various aspects of the subject technology. Although the blocks in FIG. 5 are shown in a particular order, other orderings are also possible. For example, some blocks may be performed in different orders or in parallel with other blocks. Furthermore, the process 500 may be practiced by the system 130, the mobile device 105, or another third-party.

At block 505, the system 130 or the application 115 on the mobile device 105 may determine one or more connection metrics for the video conferencing session. For example the system 130 or application 115 may determine the available network bandwidth for the video conferencing session. The one or more connection metrics may be compared with one or more threshold values at block 510 to determine, at block 515, whether the connection metrics less than a threshold value. For example, in the example scenario above, the available network bandwidth may be compared with one or more bandwidth thresholds to determine whether a video conferencing session is to be adjusted. Furthermore, although the process 500 in FIG. 5 compares a connection metric with a threshold value to see if the connection metric is below a threshold value, in other variations, other connection metrics may be compared with other threshold values to determine whether the connection metrics meet or exceed one or more threshold values.

In FIG. 5, if the one or more connection metrics is less than a threshold value, at block 520, the video conferencing session may be adjusted based on the connection metric being less than the threshold value. If the one or more connection metrics is not less than a threshold value, at block 525, the system 130 or the application 115 on the mobile device 105 may continue to monitor the connection metrics for the video conferencing session so that when a connection metric falls below a threshold value (or another connection metric meets or exceeds another threshold value), the video conferencing session may be appropriately adjusted.

Although FIG. 5 illustrates that connection metrics are compared to threshold values, in other aspects, the connection metrics may be compared to predefined sets of connection characteristics to see whether there is a match. If there is a match, the video conferencing session may be adjusted based on video conferencing characteristics associated with the matching predefined set of connection characteristics.

The connection metrics may be determined prior to initiating the video conferencing session and/or during the video conferencing session. Furthermore, after one or more adjustments are made, the connection metrics may continue to be monitored in order to determine whether additional adjustments are to be made. Adjustments may include, for example, switching from a bi-directional video stream in the video conferencing session to a uni-directional video stream, switching from a video stream in the video conferencing session to an audio stream, or switching from an audio stream in the video conferencing session to text communications.

Additionally, in some cases, images captured using the mobile device 105 may be transmitted to the system 130 during the video conferencing session. In other cases, the images captured using the mobile device 105 may be stored in a memory by the mobile device 105 until the connection metrics indicate that the communication channels are able to handle transmission of the images to the system 130 (e.g., after the video conferencing session is over or when available network bandwidth increases).

According to some aspects of the subject technology, the video conferencing session between the user and the claims adjuster 140 may begin as a bi-directional video stream. In the bi-directional video stream, the user on the mobile device 105 may receive a video stream from a camera in communication with the system 130. This video stream from the system 130 may be of the claims adjuster 140. Additionally, the bi-directional video stream also includes the system 130 receiving a video stream from one or more cameras (e.g., a front-facing camera on the mobile device 105 or a rear-facing camera on the mobile device 105) in communication with the mobile device 105. This video stream from the mobile device 105 may be of the user and/or of an insured item.

If the network bandwidth available is less than a first threshold bandwidth value (e.g., an estimated bandwidth needed to support a bi-directional video stream), the system 130 or the application 115 on the mobile device 105 may be configured to adjust the video conference session to be a uni-directional video stream. According to various aspects of the subject technology, the uni-directional video stream may be a video stream from the mobile device 105 transmitted to the system 130 or a video stream from the system 130 transmitted to the mobile device 105.

The choice in streams may be determined based on, for example, a current party that is speaking. If the user is speaking, the uni-directional video stream may be the video stream from the mobile device 105 transmitted to the system 130. If the claims adjuster 140 is speaking the uni-directional video stream may be the video stream from the system 130 transmitted to the mobile device 105. The choice in streams may also be determined based on a stage in the claims adjustment process or a source of a video stream. For example, if the claims adjustment stage is at a stage where the user is capturing images or video of an insured object (e.g., a damaged vehicle) or if the video stream being generated at the mobile device 105 is from a front-facing camera rather than a rear-facing camera, the uni-directional video stream may be the video stream from the mobile device 105 transmitted to the system 130.

Additionally or alternatively, if the network bandwidth available is less than a second threshold bandwidth value (e.g., an estimated bandwidth needed to support a uni-directional video stream) that may be lower than the first threshold bandwidth value, the system 130 or the application 115 on the mobile device 105 may be configured to adjust the video conference session from a bi-directional or uni-directional video stream to include only audio.

Additionally or alternatively, if the network bandwidth available is less than a second threshold bandwidth value (e.g., an estimated bandwidth needed to support a uni-directional video stream) that may be lower than the first threshold bandwidth value, the system 130 or the application 115 on the mobile device 105 may be configured to adjust the video conference session from a bi-directional video stream, a uni-directional video stream, or an audio stream to be limited to text communications. The above examples are provided for illustrative purposes only as other variations may also be implemented. For example, different combinations of the above mentioned communications means may also be used.

Figure 6:
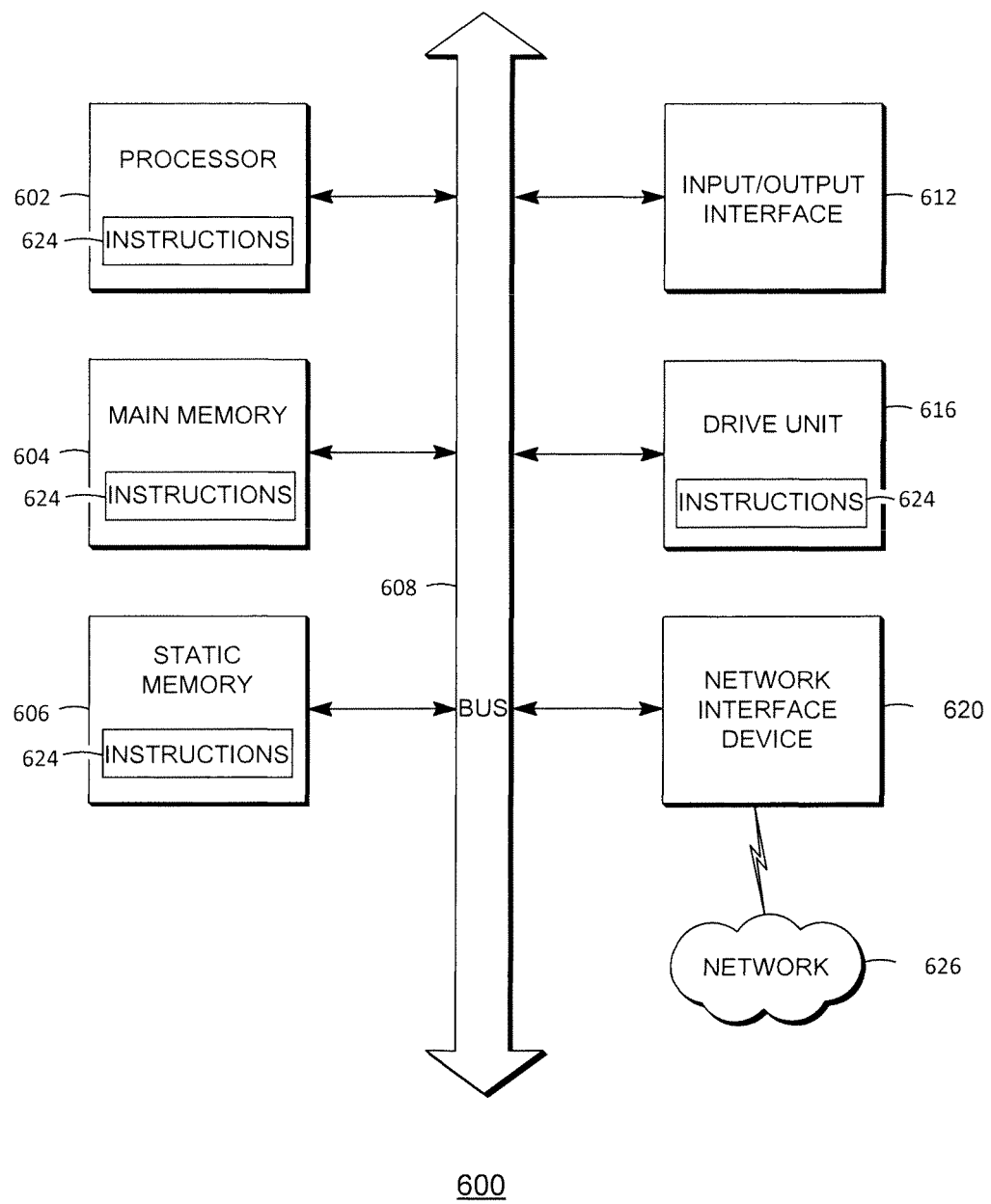
FIG. 6 is a block diagram illustrating an example computer system with which any of the computing machines, devices, or systems discussed herein may be implemented, in accordance with some aspects of the subject technology.

FIG. 6 is a block diagram illustrating an example computer system 600 with which any of the computing machines, devices, or systems discussed herein may be implemented, in accordance with some aspects of the subject technology. In certain aspects, the computer system 600 may be implemented using hardware or a combination of software and hardware, either in a dedicated server, or integrated into another entity, or distributed across multiple entities.

The example computer system 600 includes a processor 602, a main memory 604, a static memory 606, a disk drive unit 616, and a network interface device 620 which communicate with each other via a bus 608. The computer system 600 may further include an input/output interface 612 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 602 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 624 embodying any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media. The instructions 624 may further be transmitted or received over a network 626 via the network interface device 620.

The machine-readable medium may be a single medium or multiple media (e.g., a centralized or distributed database, and/or associated caches and servers) that store the one or more sets of instructions. The machine-readable medium may include the drive unit 616, the static memory 606, the main memory 604, the processor 602, an external memory connected to the input/output interface 612, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method, comprising:
   establishing, by a remote system associated with a claims adjuster, a video conferencing session between the remote system and a mobile device associated with a user;
   generating, by the remote system, a user interface configured to receive, from the claims adjuster, one or more instructions for requesting remote control of a set of functions on the mobile device associated with the user during the video conferencing session, wherein the set of functions includes providing a location of the mobile device and capturing an image with a camera comprising the mobile device;
   receiving, via the user interface, a first instruction for requesting the location of the mobile device and a second instruction for requesting the mobile device to capture the image;
   transmitting, during the video conferencing session, a first request configured to cause the mobile device to provide the location of the mobile device and a second request configured to cause the mobile device to capture the image; and
   receiving, at the remote system, the location of the mobile device and the image captured by the mobile device, wherein the image captured by the mobile device is verified based at least on the location of the mobile device.

2. The method of claim 1, wherein the set of functions further includes at least one of activating a flash when capturing the image, turning on a light on the mobile device, zooming the camera focusing the camera, or adjusting an exposure setting on the camera.

3. The method of claim 1, wherein the set of functions further includes switching a view on a display of the mobile device to at least one of front-facing camera view, a rear-facing camera view, a portrait view, a landscape view, or a video conferencing view.

4. The method of claim 1, wherein the set of functions further comprise displaying, on a display at the mobile device, a visual indicator overlay on an object, wherein the visual indicator overlay comprises at least one of an arrow, a box, a bracket, or a highlighting.

5. The method of claim 1, further comprising:
   determining at least one connection metric for the video conferencing session; and
   adjusting, based on the at least one connection metric, the video conferencing session.

6. The method of claim 5, wherein the at least one connection metric comprises a network bandwidth available for the video conferencing session.

7. The method of claim 5, wherein the adjusting of the video conferencing session comprises at least one of switching from a bi-directional video stream in the video conferencing session to a uni-directional video stream, switching from a video stream in the video conferencing session to an audio stream, or switching from an audio stream in the video conferencing session to text communications.

8. The method of claim 1, wherein the image captured by the mobile device depicts a vehicle associated with an insurance product.

9. The method of claim 8, further comprising:
   receiving, from the claims adjuster via the user interface, at least one determination associated with the insurance product; and
   adjusting the insurance product based on the at least one determination.

10. The method of claim 1, further comprising:
    storing, in a memory, at least one of the image captured by the mobile device or a video stream from the mobile device.

11. A system comprising:
    at least one data processor; and
    at least one memory storing instructions, which when executed by the at least one data processor, cause operations comprising:
        establishing, by a remote system associated with a claims adjuster, a video conferencing session between the remote system and a mobile device associated with a user;
        generating, by the remote system, a user interface configured to receive, from the claims adjuster, one or more instructions for requesting remote control of a set of functions on the mobile device associated with the user during the video conferencing session, wherein the set of functions includes providing a location of the mobile device and capturing an image with a camera comprising the mobile device;
        receiving, via the user interface, a first instruction for requesting the location of the mobile device and a second instruction for requesting the mobile device to capture the image; and transmitting, during the video conferencing session, a first request configured to cause the mobile device to provide the location of the mobile device and a second request configured to cause the mobile device to capture the image; and receiving, at the remote system, the location of the mobile device and the image captured by the mobile device, wherein the image captured by the mobile device is verified based at least on the location of the mobile device.

12. The system of claim 11, wherein the image captured by the mobile device depicts a vehicle involved in an incident, and wherein the image is stored in a memory.

13. The system of claim 11, wherein the operations further comprise:

determining at least one connection metric for the video conferencing session;

adjusting, based on the at least one connection metric, the video conferencing session.

14. A non-transitory machine-readable medium comprising instructions stored therein, which when executed by a machine, cause the machine to perform operations comprising:

establishing, by a remote system associated with a claims adjuster, a video conferencing session between the remote system and a mobile device associated with a user;

generating, by the remote system, a user interface configured to receive, from the claims adjuster, one or more instructions for requesting remote control of a set of functions on the mobile device associated with the user during the video conferencing session, wherein the set of functions includes providing a location of the mobile device and capturing an image with a camera comprising the mobile device;

receiving, via the user interface, a first instruction for requesting the location of the mobile device and a second instruction for requesting the mobile device to capture the image;

transmitting, during the video conferencing session, a first request configured to cause the mobile device to provide the location of the mobile device and a second request configured to cause the mobile device to capture the image; and receiving, at the remote system, the location of the mobile device and the image captured by the mobile device, wherein the image captured by the mobile device is verified based at least on the location of the mobile device.

15. A method, comprising:

establishing, at a mobile device associated with a user, a video conferencing session between the mobile device and a remote system associated with a claims adjuster;

receiving, from the remote system and during the video conferencing session, a first request to provide a location of the mobile device and a second request to capture an image with a camera at the mobile device;

determining, in response to the first request, the location of the mobile device;

capturing, in response to the second request, the image using the camera at the mobile device; and transmitting, to the remote system, the location of the mobile device and the image captured by the mobile device, wherein the image captured by the mobile device is verified based at least on the location of the mobile device.

16. The method of claim 15, further comprising:

receiving, at the mobile device, a third request for at least one of activating a flash when capturing the image, zooming the camera before capturing the image, focusing the camera before capturing the image, adjusting an exposure setting on the camera before capturing the image, or or switching a view on a display on the mobile device.

17. The method of claim 15, further comprising:

determining at least one connection metric for the video conferencing session;

adjusting, based on the at least one connection metric, the video conferencing session.

18. The method of claim 17, wherein the adjusting of the video conferencing session comprises at least one of switching from a bi-directional video stream in the video conferencing session to a uni-directional video stream, switching from a video stream in the video conferencing session to an audio stream, or switching from an audio stream in the video conferencing session to text communications.

19. The method of claim 17, wherein the adjusting of the video conferencing session comprises:

temporarily storing, in an image buffer on the mobile device, the image captured by the mobile device; and determining a change in the at least one connection metric for the video conferencing session, wherein the captured image is transmitted to the remote system associated with the claims adjuster based on the change in the at least one connection metric.

* * * * *